Feb. 21, 1967  N. MÜLLER ETAL  3,304,820
FABRIC-CUTTING MACHINE AND METHOD
Filed July 26, 1965  5 Sheets-Sheet 1
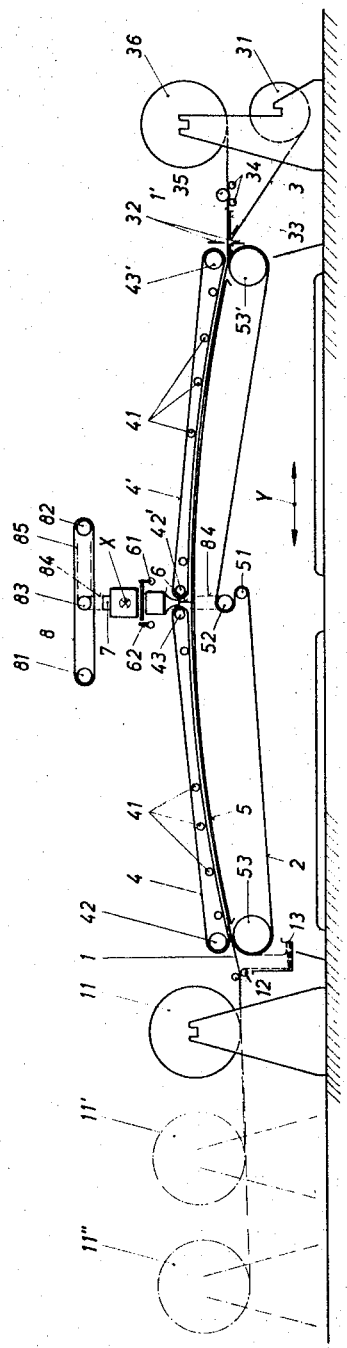
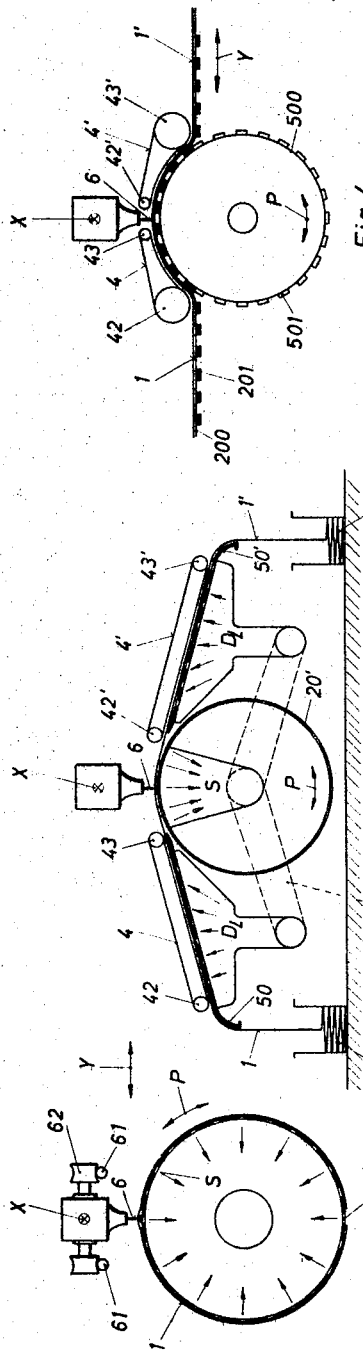
INVENTORS.
NICOLAUS MÜLLER
FRITZ SCHUMANN
BY BRUNO BYSTRON
Robert W. Beach
ATTORNEY

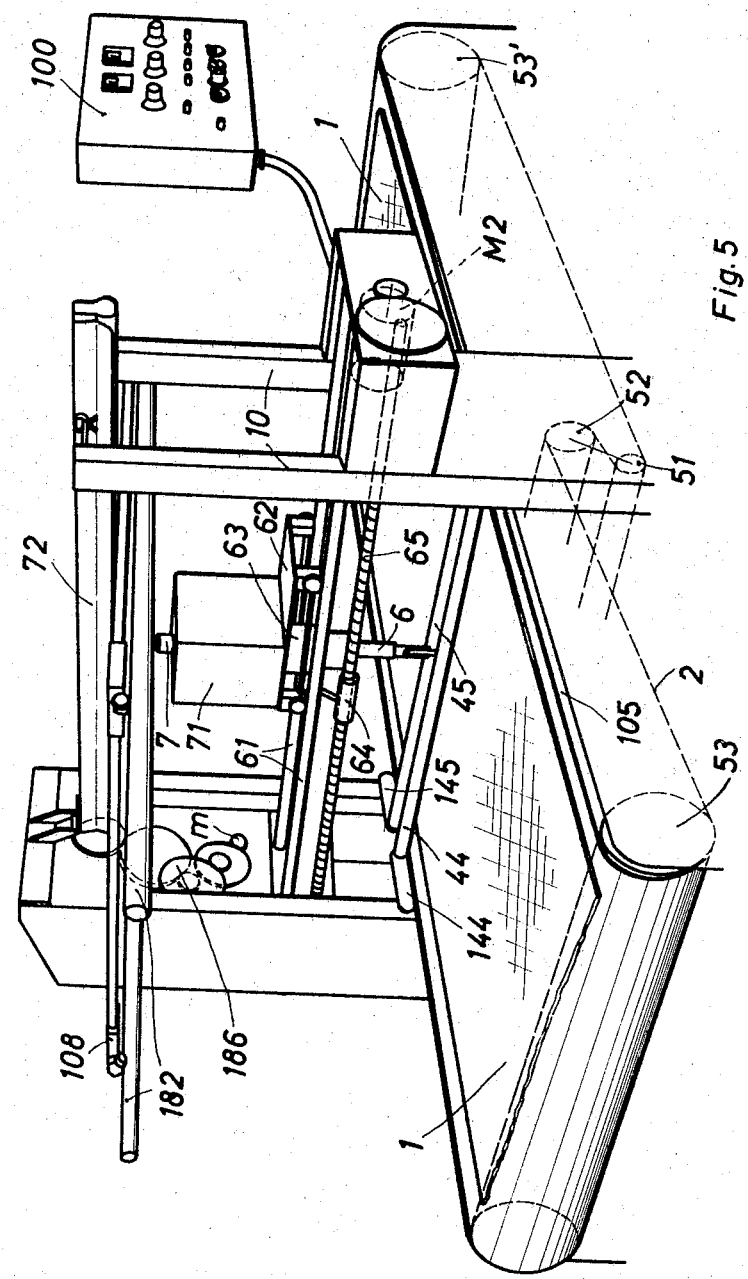

United States Patent Office 3,304,820
Patented Feb. 21, 1967

3,304,820
FABRIC-CUTTING MACHINE AND METHOD
Nicolaus Müller, Trier, and Fritz Schumann and Bruno Bystron, Ingolstadt, Germany, assignors to Schubert & Salzer Maschinenfabrik Aktiengesellschaft, Ingolstadt, Germany, a corporation of Germany
Filed July 26, 1965, Ser. No. 474,716
Claims priority, application Germany, Aug. 1, 1964, Sch 35,571
22 Claims. (Cl. 83—25)

This invention relates to a method for automatically cutting garment components from a continuous web of fabric in accordance with a given pattern and to apparatus for performing such method.

Various methods are known for automatically cutting garment components from textiles corresponding to a pattern. In such methods it is customary for a length of fabric from a rack or bolt to be spread on a cutting table and cut by a suitable cutting implement. Previously a cutting implement has been mounted on a carriage whereby it can be moved universally over the entire surface of a stationary workpiece such as shown in U.S. Patents 2,958,247 and 2,172,313. This arrangement, however, has the disadvantage that the load moved by the driving mechanism is relatively large so that its response to direction signals and thus the cutting speed is substantially reduced. Moreover, the carriage and cutting implement must move over a relatively large area. Also the cutting surface must be of a character such that it will remain precisely level and be such that the cutting implement will glide smoothly over it, cutting the fabric without engaging rough or warped portions of the surface. Therefore, such equipment is complex and expensive.

The size of the cutting surface is determined by the article to be cut. For example, for a man's suit a cutting surface of at least 2½ by 10 feet is required. In addition, the fabric on such surface must be held firmly to prevent stretching and twisting, which requires a relatively powerful suction distributed over the whole surface. Mechanism for simply moving a length of fabric in a continuous forward direction while a cutting device moves transversely of the direction of fabric movement is well known. Such mechanism is suitable only for cutting very simple patterns, such as for undergarments, handkerchiefs and gloves, wherein the cutting implement basically moves in a straight line. Such cutting mechanism is not adapted for cutting fabric corresponding to patterns which require the cutting implement to execute complex motions for cutting along curves, around corners, cutting notches and the like.

It is an object of the present invention to provide a method and corresponding mechanism which will overcome the problems discussed above and which will enable known cutting techniques, such as disclosed in U.S. Patent No. 3,245,295, for example, to be employed economically.

It is a further object to provide means whereby the cutting operation can be performed continuously independent of schedules, work stoppages or interruptions of succeeding operations, such as sorting and fabrication of the articles of clothing, so that the mechanism of the present invention may be employed to its optimum capacity.

It is an additional object to provide means whereby the cut fabric pieces can be maintained in the sequence in which they were cut to minimize subsequent sorting operations.

The foregoing objects can be accomplished by providing a fabric support which can be reciprocated lengthwise of the fabric, a cutting implement which may be reciprocated simultaneously in a direction transversely of the fabric length, and means for altering the attitude of the cutting implement to correspond to the direction of cutting resulting from relative movement of the fabric and cutting implement. The movable fabric support may be perforated in the area adjacent to the cutting implement so that suction can be applied to the fabric to hold it against wrinkling, twisting or stretching during cutting. The fabric support may include one or more endless conveyor belts, a rotating drum, or a combination of such belts and drums. Spaced along the length of the fabric fore and aft of the cutting area, pressure means, such as continuous belts, rollers or streams of compressed air, may be provided above the fabric-supporting means to press the fabric firmly against the supporting means.

After a length of fabric has been cut it may be severed from the succeeding length of fabric, transferred from the supporting means to a continuous carrier sheet, and such fabric and sheet wound onto a receiving roll. Such a roll of cut fabric lengths may then be transported to a succeeding work station or stored for later use.

In order to reduce the load which must be moved by the mechanism of the present invention, a predetermined length of fabric may first be pulled from a roll or bolt of material and deposited in a storage bin on the infeed side of the fabric-supporting means. The pattern for cutting is preferably carried by separate mechanism above the cutting implement so that it need not be carried by the fabric-supporting means, and such pattern may direct the cutting simultaneously of several cutting machines of the present invention. As mentioned above, lengths of fabric previously cut are severed from successive fabric lengths before being wound onto the receiving roll to further reduce the load to be moved by the present mechanism.

FIGURE 1 is a side elevation of a schematic representation of the cutting machine of the present invention.

FIGURE 2 is a side elevation of a portion of the cutting machine illustrating a modification wherein the fabric support is a rotating suction drum.

FIGURE 3 is a side elevation of a further modification in which the suction drum is combined with stationary fabric-supporting means.

FIGURE 4 is a side elevation of a modification of the invention wherein the fabric-supporting means combines an endless conveyor and a rotating drum.

FIGURE 5 is a perspective of a further modification of the present invention.

Figure 8:
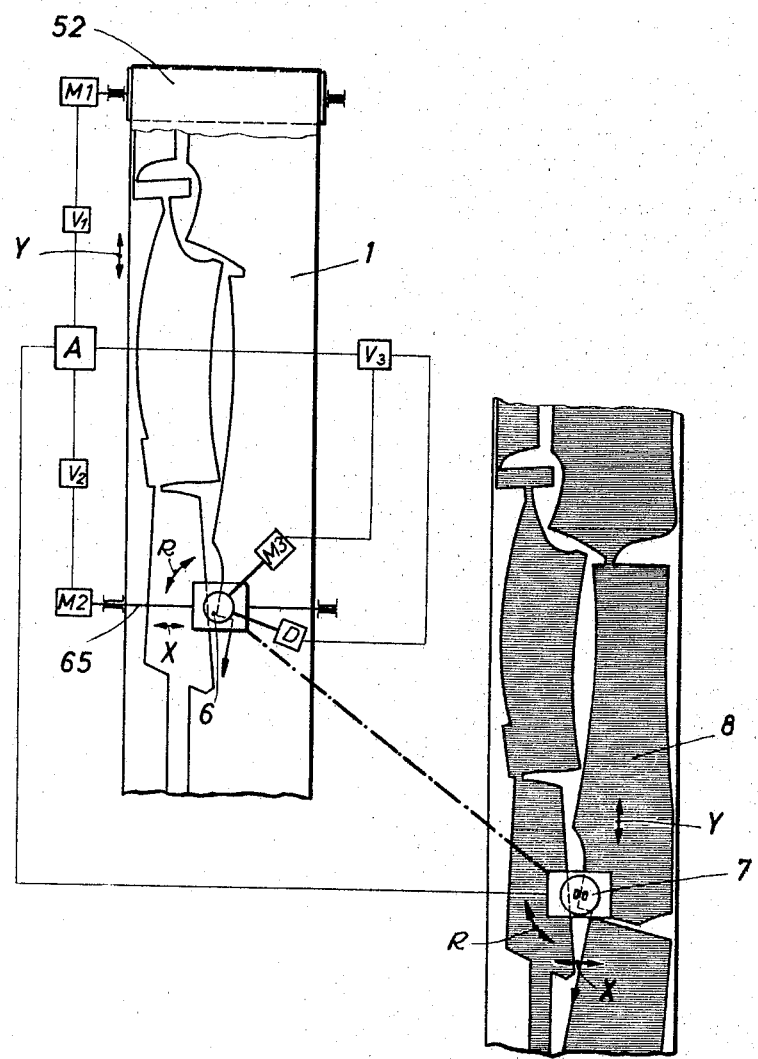
FIGURE 8 is a schematic diagram illustrating the coordination of the pattern sensing means and fabric-cutting mechanism shown in FIGURES 5, 6 and 7.

As shown in FIGURE 1 a length of fabric 1 is pulled from a roll 11 or other suitable fabric storage means by feed rollers 12 and fed to a cutting implement 6. The cutting implement is reciprocably mounted on a carriage 62 which runs on tracks 61. The line along which the cutting implement reciprocates, hereinafter designated the X-coordinate indicated by the arrows in FIGURE 8, is perpendicular to the direction of movement of the fabric length, hereinafter designated the Y-coordinate indicated by the arrows in FIGURES 1 to 4 and 8. The cutting implement has a foot (not shown) beneath the fabric which forms a counterknife. The fabric-supporting means in the form of machine shown in FIGURE 1 is an endless conveyor belt 2. The conveyor belt slides over an arched supporting surface 5. Alternatively, such supporting surface may be flat as shown in FIGURE 5; however, an arched surface is preferred because it tends to keep the fabric smooth. The length of the supporting surface 5 fore and aft of the cutting implement 6 is determined by the size of the pattern to be cut.

It has been found practical to provide pressure means above the fabric 1 to prevent twisting, wrinkling or bunching of the fabric and to insure that the fabric and the supporting means move together during reciprocation of such supporting means. The pressure means are shown as endless covering belts 4 and 4' fore and aft, respectively, of the cutting implement 6 and are driven synchronously with the conveyor belt 2. The covering belt 4 is tensioned and driven by rollers 42, 43 and belt 4' is tensioned and driven by rollers 42', 43'. In order to increase the pressure on the fabric, backing rollers 41 engaging the upper sides of the lower belt stretches may also be provided.

The conveyor belt 2 extends between the forward roller 53 and the aft roller 53', the upper stretch of which belt is carried by supporting surface 5. Such belt is tensioned by a tightening roller 51 located below the supporting surface 5. The conveyor belt 2 is driven by drive roller 52 which is turned by a chain drive 84 in synchronism with movement of the pattern 8 in a manner further described below.

It is unnecessary for the pattern and sensing means to be located in any particular spatial relationship with the cutting implement and fabric. Therefore, the pattern 8 may be located in any desired position, such as for controlling several cutting machines simultaneously. In the construction shown in FIGURE 1, the pattern is in the form of an endless belt extending around tension rollers 81 and 82, which pattern is parallel to the horizontal plane defined by the X- and Y-coordinates. This belt is driven by motor M1 in synchronism with fabric-supporting belt 2. The sensing means 7 is mounted on carriage 62 of the cutting implement 6 and is coupled directly with such cutting implement. This relative arrangement of the fabric, cutting implement and pattern reduces the load which must be moved by the driving mechanism because it enables the cutting implement to be mounted on a stationary frame instead of a movable gantry in order to follow the pattern.

Separate drive motors have been supplied for effecting cutting motions corresponding to the X- and Y-coordinates, respectively. The motor M1 for driving conveyor belt 2 and pattern 8 in a manner corresponding to the Y-coordinate motion and motor M2 for driving carriage 62 corresponding to the X-coordinate motion are fixedly mounted on a bridge 10, shown in FIGURE 5. Special drive means, which are shown in the drawings as motor M11 and electromagnetic couplings 54 and 55, are provided for energization and deenergization of feed rolls 12 and pulling rollers 34 and 35, which drive means can be operated by hand or automatically from a control panel 100.

Figure 6:
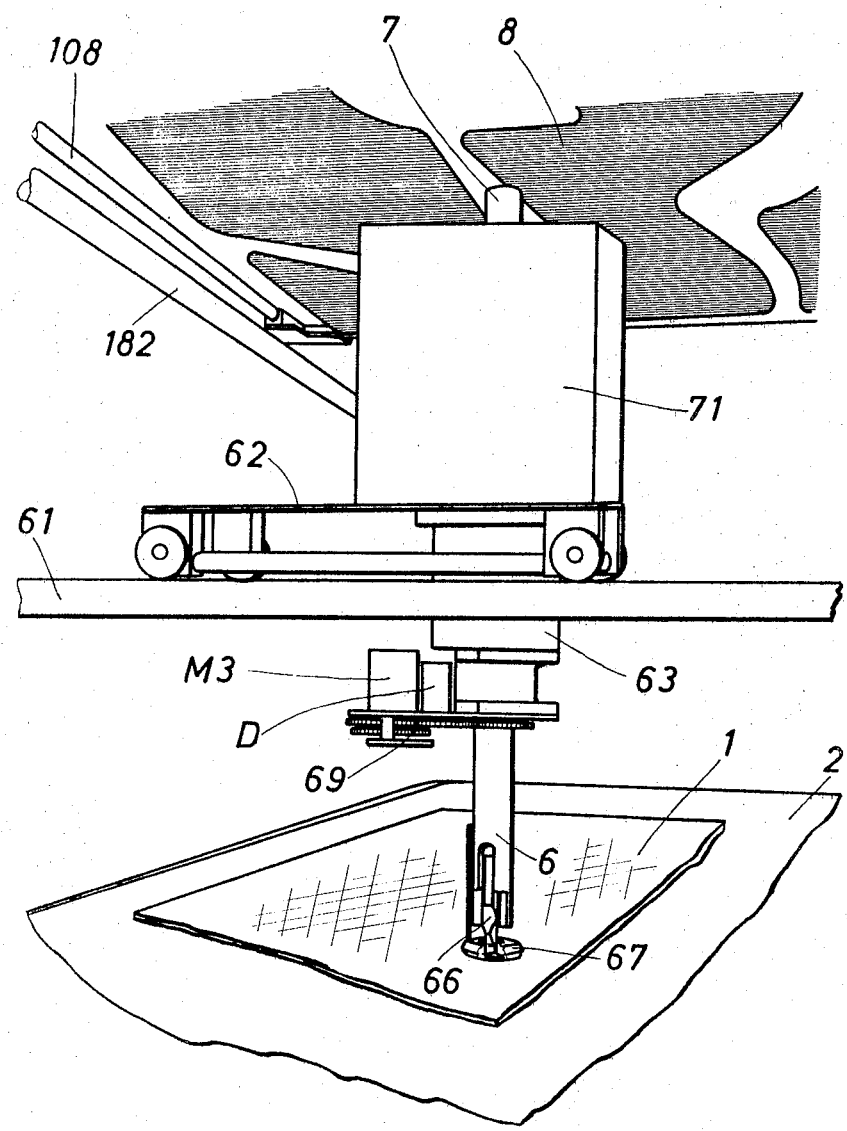
FIGURE 6 is a detail perspective of the sensing means and cutting implement shown in FIGURE 5.

In the form shown in FIGURE 5, the supporting surface 105 is level, instead of arched as in the device of FIGURE 1. Directly in front of and behind the working area of the cutting implement 6 are pressure rollers 44 and 45 which may be swung on arms 144 and 145 out of engagement with the fabric 1. The bridge 10 supports both the drive means and the tracks 61 for guiding the carriage 62 carrying cutting implement 6 and the sensing means 7. The bridge 10 also supports two tracks 182 for guiding the pattern-supporting frame 108, instead of the pattern being in the form of an endless belt 8 as in FIGURE 1. As shown in FIGURE 6, the frame 108 is a movable frame which carries two transparent plates of Plexiglas, for example, or similar material, between which plates the pattern 8 is placed. Frame 108, carrying the cutting pattern to be sensed, is reciprocated in the Y-direction synchronously with the fabric-supporting means 2. Extending across the width of the pattern 8 is a fixed illumination source 72 which projects a narrow beam of light onto the pattern in registry with the sensing means 7 so that the pattern can be photoelectrically traced by the sensing means in a well-known manner. Such a narrow fixed band of light is used instead of illuminating the entire pattern by a light moving with the pattern and shining through it.

The carriage 62 carries the sensing means 7 located in housing 71 with the cutting implement 6. Such cutting implement is shown in FIGURE 6 as the knife 66, driven by an oscillating motor 63, encircled by a ring 67 for holding the fabric down in the area adjacent to the knife. Angle control means D controls a motor M3 driving gearing 69 mounted on carriage 62 to maintain the cutting knife 66 with its cutting edge directed forward with respect to the relative movement of the cutting implement and the fabric and the sensing means in a position tangential to the pattern line being traced.

Figure 7:
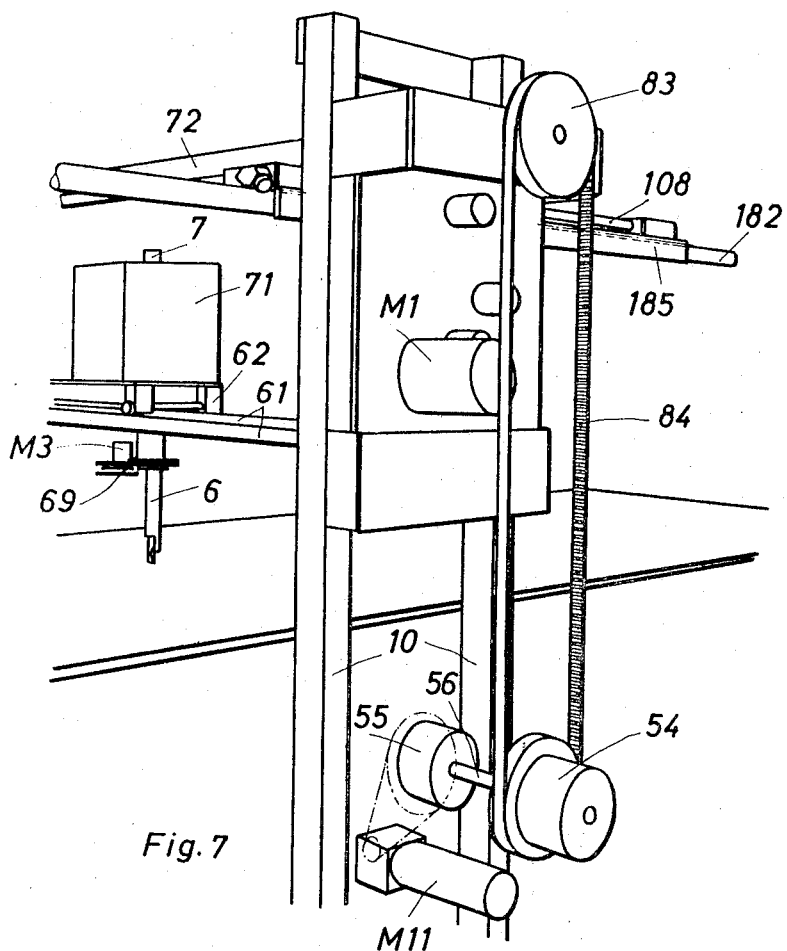
FIGURE 7 is a detail perspective viewed from the side opposite that of FIGURE 5.

In FIGURES 5 and 7 the drive means are shown in detail. The shaft $m$ of motor M1 drives a pinion by gearing 186, shown in FIGURE 5, which meshes with a rack 185 fastened to frame 108 to effect movement of the frame in the direction of the Y-coordinate. Couplings 54 and 55 are carried on shaft 56 of drive roller 52 for the conveyor belt 2. When the pattern frame 108 and conveyor belt 2 are to be driven synchronously, motor M1 is energized to drive the rack and pinion 185, 186, wheel 83 and chain 84, and coupling 54 is connected to drive shaft 56. When conveyor belt 2 is to be moved independently of the pattern, such as for feeding more material from roll 11 and to wind the cut fabric on roll 36, coupling 54 is disconnected and coupling 55 is connected to motor M11. As discussed above motor M11 may also drive feed rollers 12 and pulling rollers 34, 35.

The drive motor M2 for effecting movement of the cutting implement 6 in the direction of the X-coordinate drives a feed screw 65 which carries the nut 64 for driving the carriage 62, as shown in FIGURE 5.

FIGURE 8 is a block diagram showing the circuit connections of the drive motors with the sensing means 7. Signals received from sensing means 7 are first fed to a resolution device A which resolves the impulses into three components corresponding to the X-coordinate, the Y-coordinate and rotation R of the cutting element 6 and sensing means 7, as indicated by the respective arrows in FIGURE 8. The X-signal components are fed through amplifier V2 to the drive motor M2 and the Y-signal components are fed through amplifier V1 to the drive motor M1 for determining the direction and extent of turning of the respective motor shafts. The rotative signal components R are fed through an amplifier V3 to the rotary motor M3, to guide the rotation of the cutting implement and sensing means, and simultaneously to an angle control device D. The rotation executed by the cutting implement 6 is transmitted by the gear drive 69, shown in FIGURE 6, to the angle control device D. When the rotation corresponds to the signal received by the angle control device from amplifier V3, such angle control device transmits a signal through the amplifier V3 to motor M3 to prevent further rotation of the cutting implement. As indicated by the dot-dash line in FIGURE 8, the sensing means 7 and the cutting implement 6 are located on a common vertical rotation axis and may be mechanically or electrically coupled for conjoint movement.

The mechanism operates as follows:

First, the drive motor M11 and the coupling 55 are actuated from the control panel 100. A length of fabric 1 is pulled from the roll 11 by the pair of feed rollers 12 and fed to the conveyor belt 2, the length of which extends approximately from the nip of the forward rollers 42 and 53 to the aft rollers 43' and 53'. The cutting implement 6 is located at an extreme side position out of registry with the fabric and conveyor belt 2 during this operation. After a length of material corresponding to twice the length of the pattern which is to be cut has been pulled from a roll 11, the pair of feed rollers 12 is deenergized and conveyor belt 2 is reversed until the leading edge of the length of fabric is in a position adjacent to the cutting implement 6.

When the fabric is in this starting position, the length of fabric extending from forward rollers 42 and 53 to the cutting implement corresponds to the length of fabric required for cutting one complete set of garment components in accordance with the pattern. A similar length of fabric is deposited in temporary storage trough 13 when conveyor belt 2 is reversed to move the fabric leading edge into starting position. Then the cutting implement 6 and sensing means 7 are moved into position corresponding to the starting point on pattern 8. From this point the sensing means then actuates the drive means for the pattern, cutting implement and conveyor belt to cut the fabric automatically corresponding to the pattern. Such automatic cutting may be performed in accordance with the procedure of the copending application Serial No. 210,464.

As the length of fabric 1 threaded between the covering belt 4 and the conveyor belt 2 advances in the direction of the Y-coordinate during cutting, fabric 1' which has already been cut by the cutting element 6 is gradually moved into a position beneath the second covering belt 4' beyond the cutting implement 6. During such cutting the cutting implement reciprocates transversely of the fabric length in the direction of the X-coordinate and rotates about its vertical axis so that the attitude of the cutting knife is oriented to the cutting direction resulting from the combined movement of the fabric and the cutting implement along both coordinates. If the cutting pattern has an endless cutting line in accordance with the disclosure of copending application Serial No. 210,464, the conveyor belt and fabric will be moved forward the full length of the pattern and then reversed to return to the starting point conjointly with the pattern 8. As the fabric length being cut is moved from the starting point to its extreme position, the reserve length of fabric is pulled from the storage trough 13 and, as the fabric being cut returns to the starting position, the reserve fabric length returns to the storage trough. Provision of such reserve length of fabric, therefore, eliminates the necessity for additional drive means to oscillate correspondingly the fabric roll 11 which would be required if fabric were simply pulled continuously from such roll without any slack between such roll and the fabric support.

When the cutting of an entire pattern has been completed and the cutting implement 6 and the fabric 1 have returned to the starting point, the cutting implement 6 is again moved out of registry with the fabric and such fabric is advanced toward rollers 43' and 53'. The length of cut fabric 1' is discharged from the conveyor belt 2 between the rollers 43' and 53' onto a carrier sheet 3 which is pulled from a roller 31, the carrier sheet providing the support lost by the fabric as the result of cutting so that the individual pieces cut out from the fabric are maintained in the order in which they are cut to eliminate extra sorting. Such cut fabric 1' and carrier sheet 3 are advanced by pulling rollers 34 and 35 and wound onto roll 36. Simultaneously, a new length of fabric is pulled by the pair of feed rollers 12 from the fabric roll 11. A table 33 supports carrier sheet 3 at the location where such sheet receives the cut fabric 1'. At a location between rollers 43', 53' and table 33, cutting means 32 are provided to sever the cut fabric section 1' from the uncut fabric 1. The leading edge of fabric length 1 is then returned to the starting position adjacent to cutting implement 6 and the cutting process is repeated.

If desired, the cutting machine of the present invention can be placed in a production line so that the cut fabric could be advanced sequentially to sorting and subsequent operations. However, rolling of the cut fabric and carrier sheet has the advantage that cutting can be performed completely independently of subsequent operations. The roll 36 would be transported to a separate sorting station so that sorting can be effected in accordance with a separate work schedule, or the roll can be stored until required to compensate for variations in production. Empty spools and carrier sheet rolls 31 are then provided for the cutting machine. If desired, several thicknesses of fabric can be cut simultaneously by providing, for example, several fabric rolls 11, 11' and 11" ahead of the cutting machine.

In order to decrease the friction between the moving conveyor belt 2 and the supporting surface 5 preferably five or more transport rollers may be provided between such belt and the supporting surface or slits in the supporting surface may be provided for introducing a compressed air film between such supporting surface 5 and conveyor belt 2. To hold the fabric more firmly in the area of the cutting implement 6 suction may be provided beneath the supporting surface 5 and the conveyor belt 2 in such cutting area.

FIGURE 2 shows a further modification of the cutting machine in which the fabric-supporting means is a perforated drum 20. The length of fabric 1 which is to be cut is held firmly to the drum by a suction flow S. The drum has an oscillating motion in the direction of the arrow P to effect movement of the fabric in the direction of the Y-coordinate during cutting.

In the form of the invention shown in FIGURE 3, drum 20' comprises one section of the fabric-supporting means. One sector of the circumference of such drum supports and moves the fabric 1 below the cutting implement 6, such fabric being held firmly for cutting by a suction force S. Fore and aft of the drum are fabric-supporting surfaces 50 and 50'. To avoid the sliding friction between the fabric and the supporting surfaces 50 and 50' such surfaces can be perforated to provide compressed air streams DL whereby the fabric lengths 1 and 1' are pressed against the covering belts 4 and 4', respectively, which belts are driven in synchronism with drum 20'. Through connecting tubes 54 the suction flow S is simultaneously used to create the compressed air streams C. In this illustration the fabric 1 is fed from a trough 13' and the cut fabric 1' is received in a trough 36'.

In the modification shown in FIGURE 4, the supporting surface is a rotating drum 500 over which runs a fabric-supporting conveyor belt 200 strengthened with slats 201. To effect movement of the conveyor belt 200, the slats 201 are interdigitated with cleats 501 of the drum 500. Two cover belts 4 and 4' press the fabric 1 against the conveyor belt 200 and simultaneously urge the slats 201 into interdigitation with the drum cleats 501. Operation of the cutting machine may be performed by any of the methods discussed above.

It will be readily seen that further variations of this invention may be made simply by combining the individual components of the several forms illustrated, such as, for example, providing fabric-supporting means including several supporting surfaces with one or more rotating drums between such supporting surfaces and endless conveyor belts fore and aft of the supporting surfaces or drums. For pressing the fabric against the fabric supporting means, pressure rollers or compressed air, for example, may be substituted for the covering belts.

For driving the cutting implement 6 or fabric 1 various well-known sensing and drive mechanisms of an electrical, electronic, optical or mechanical type may be used or, for example, the pattern may be programmed on punch cards or tapes and the movements corresponding to the X- and Y-coordinates may be effected by computer means.

We claim as our invention:

1. The method of cutting garment components from a piece of fabric by a cutting implement in accordance with a predetermined pattern, which comprises moving the fabric piece along a given linear path relative to the cutting implement, translating the cutting implement relative to the fabric piece transversely of such given linear path in which the fabric piece is moved, and during such linear movement of the fabric piece and translation of the cutting implement relative to the fabric piece turning the cutting implement as necessary in order to maintain its cutting edge directed forward with respect to the relative movement of the cutting implement and the fabric piece effected by such conjoint movements of the fabric piece relative to the cutting implement and of the cutting implement relative to the fabric piece.

2. The method defined in claim 1, including feeding a continuous length of fabric in one direction toward one side of the cutting implement and removing cut fabric by withdrawing it from the opposite sides of the cutting implement generally in the same direction as that in which the continuous length of fabric is fed to the cutting implement.

3. The method of cutting garment components from a piece of fabric by a cutting implement in accordance with a predetermined pattern, which comprises feeding a continuous length of fabric along a given linear path toward one side of the cutting implement, moving the length of fabric along such given linear path in opposite directions relative to the cutting implement, translating the cutting implement relative to the length of fabric transversely of such given linear path while the length of fabric is moving, and removing cut fabric by withdrawing it along such given linear path from the side of the cutting implement opposite that to which the continuous length of fabric is fed to the cutting implement.

4. A fabric-cutting machine comprising linearly movable cutting means, pattern means mounted for linear movement in opposite directions transversely of the direction of movement of said cutting means, fabric-supporting means, means mounting said fabric-supporting means independent of said pattern means, said fabric-supporting means being linearly movable in opposite directions transversely of the direction of movement of said cutting means, and drive means interconnecting said pattern means and said fabric-supporting means and operable to effect corresponding conjoint movement thereof in opposite direction relative to said cutting means.

5. The cutting machine defined in claim 4, in which the fabric-supporting means is roughened to grip frictionally fabric carried by said supporting means.

6. The cutting machine defined in claim 4, in which the fabric-supporting means is perforated, and suction means below such supporting means providing suction on the fabric adjacent to the cutting means for holding the fabric to the fabric-supporting means.

7. The cutting machine defined in claim 4, in which the fabric-supporting means includes a rotatable drum.

8. The cutting machine defined in claim 7, in which the fabric is supported by only one sector of the circumference of the drum.

9. The cutting machine defined in claim 7, in which the fabric-supporting means includes fixed supporting surfaces located fore and aft of the rotatable drum.

10. The cutting machine defined in claim 4, in which the fabric-supporting means includes an endless belt.

11. The cutting machine defined in claim 10, and a fixed supporting surface beneath the endless belt and arched longitudinally of such endless belt.

12. The cutting machine defined in claim 10, in which the endless belt lies on and is moved in synchronism with a movable supporting surface.

13. The cutting machine defined in claim 10, a fixed supporting surface beneath the endless belt, and means supplying air under pressure between said fixed supporting surface and such endless belt to provide a flotation air film therebetween.

14. The cutting machine defined in claim 4, in which the fabric-supporting means includes a plurality of fabric-supporting components movable in synchronism.

15. The cutting machine defined in claim 4, and hold-down means above the fabric-supporting means mounted movably relative to the cutting means and connected to the drive means for movement thereby with the pattern means and the fabric-supporting means.

16. The cutting machine defined in claim 15, in which the hold-down means includes a belt overlying fabric on the fabric-supporting means.

17. The cutting machine defined in claim 16, and pressure rollers above the belt pressing such belt against the fabric overlying the supporting means.

18. The cutting machine defined in claim 16, and air-pressure means pressing the hold-down belt against fabric overlying the fabric-supporting means.

19. The cutting machine defined in claim 4, and temporary fabric-storage means adjacent to the fabric-supporting means into which fabric can move from the fabric-supporting means and out of which fabric can move to the fabric-supporting means.

20. The cutting machine defined in claim 4, and means supporting the cutting means for movement relative to the fabric-supporting means in a direction transversely of the direction of movement of the fabric-supporting means relative to the cutting means.

21. The cutting machine defined in claim 4, and sensing means below the pattern means for sensing the pattern to be cut and correspondingly actuating the drive means.

22. The cutting machine defined in claim 21, in which the sensing means and the cutting means are mounted to rotate about a common vertical axis.

References Cited by the Examiner

UNITED STATES PATENTS

| 1,172,058 | 2/1916 | Scheyer | 83—71 |
| 1,543,203 | 6/1925 | Braren | 83—91 |
| 3,065,554 | 11/1962 | Colabella. | |
| 3,159,067 | 12/1964 | Heuman | 83—100 X |
| 3,238,826 | 3/1966 | Crispe | 83—236 X |
| 3,245,295 | 4/1966 | Mueller | 83—56 |

FOREIGN PATENTS

| 446,928 | 10/1928 | Germany. |
| 89,850 | 8/1957 | Norway. |

ANDREW R. JUHASZ, *Primary Examiner.*